(12) United States Patent
Divisi

(10) Patent No.: US 7,688,065 B2
(45) Date of Patent: Mar. 30, 2010

(54) PISTON STROKE COUNTING DEVICE

(75) Inventor: Walter Divisi, Egham Surrey (GB)

(73) Assignee: Sunbird Investments Limited, Channel Islands (Jersey) (GB)

( * ) Notice: Subject to any disclaimer, the term of this patent is extended or adjusted under 35 U.S.C. 154(b) by 0 days.

(21) Appl. No.: 12/120,869

(22) Filed: May 15, 2008

(65) Prior Publication Data

US 2008/0284415 A1    Nov. 20, 2008

(30) Foreign Application Priority Data

May 18, 2007   (IT)   .......................... MI2007A1006

(51) Int. Cl.
*G01B 7/14* (2006.01)
*G01R 33/07* (2006.01)

(52) U.S. Cl. .............. 324/207.24; 324/207.2; 324/207.26

(58) Field of Classification Search .............. 324/207.2, 324/207.24–207.26, 244, 251, 260–261; 73/488, 514.16, 514.31, 514.39; 123/612, 123/617

See application file for complete search history.

(56) References Cited

U.S. PATENT DOCUMENTS

| 3,453,937 | A |   | 7/1969 | Haberman |           |
|-----------|---|---|--------|----------|-----------|
| 5,909,116 | A | * | 6/1999 | Jin et al. | 324/207.24 |
| 7,259,553 | B2 | * | 8/2007 | Arns et al. | 324/207.25 |

FOREIGN PATENT DOCUMENTS

| DE | 200 03 631 | U1 | 8/2000 |
| JP | 01 031002 | A | 2/1989 |
| WO | 87/06656 | A | 11/1987 |

OTHER PUBLICATIONS

Kuhnke, Partial Translation of DE 200 03 631 U1, Aug. 17, 2000.*

* cited by examiner

*Primary Examiner*—Bot L LeDynh
(74) *Attorney, Agent, or Firm*—Ladas & Parry LLP

(57) ABSTRACT

The device for counting the strokes of a piston sliding within a cylinder comprises a support housing a magnet which generates a magnetic field. The support also houses a sensor arranged to sense the magnetic field, such that the passage of the piston into a position corresponding with the magnet causes a disturbance in the magnetic field, which is sensed by the sensor, to indicate a stroke of the piston.

10 Claims, 1 Drawing Sheet

PISTON STROKE COUNTING DEVICE

FIELD OF THE INVENTION

The present invention relates to a piston stroke counting device.

Reference will be made hereinafter in particular to a fluid measurement and/or division device, however the device of the invention can be conveniently used each time the number of strokes of a piston sliding within a cylinder is to be counted.

BACKGROUND OF THE INVENTION

Currently existing devices for counting the strokes of a piston sliding within a cylinder are provided with a rod connected to the piston; the rod cooperates with a mechanical proximity sensor which senses its movements and then operates a device for counting the piston strokes.

DISCUSSION OF THE RELATED ART

However these traditional devices present numerous drawbacks including, in particular, the poor reliability of the proximity sensors.

In this respect, these tend to wear with use and are no longer able to provide correct measurements.

Moreover mechanical proximity sensors are of large dimensions and very high cost; this influences the dimensions and cost of traditional piston stroke counting devices, which are very large and costly.

In the case of cylinders operating under high or very high internal pressure (for example 500, 1000 bars or more), traditional devices with mechanical proximity sensors cannot be used because of the poor mechanical strength of the sensors themselves; in practice, devices using mechanical proximity sensors can be used up to internal cylinder pressures of 10-15 bars.

SUMMARY OF THE INVENTION

The technical aim of the present invention is therefore to provide a piston stroke counting device by which the stated technical drawbacks of the known art are eliminated.

Within the scope of this technical aim, an object of the invention is to provide a device which is very reliable and which is specifically formed from components not subject to wear.

Another object of the invention is to provide a device of very small dimensions and low production costs.

A further object of the invention is to provide a device which can also be used in cylinders in which high or very high pressures (up to 1000 bars and more) are used.

The technical aim, together with these and other objects, are attained according to the present invention by a piston stroke counting device in accordance with claim 1.

Other characteristics and advantages of the invention are defined in the subsequent claims.

BRIEF DESCRIPTION OF THE DRAWINGS

Further characteristics and advantages of the invention will be more apparent from the description of a preferred but non-exclusive embodiment of the device of the invention, illustrated by way of non-limiting example in the accompanying drawings, in which.

DETAILED DESCRIPTION OF THE INVENTION

Figure 1:
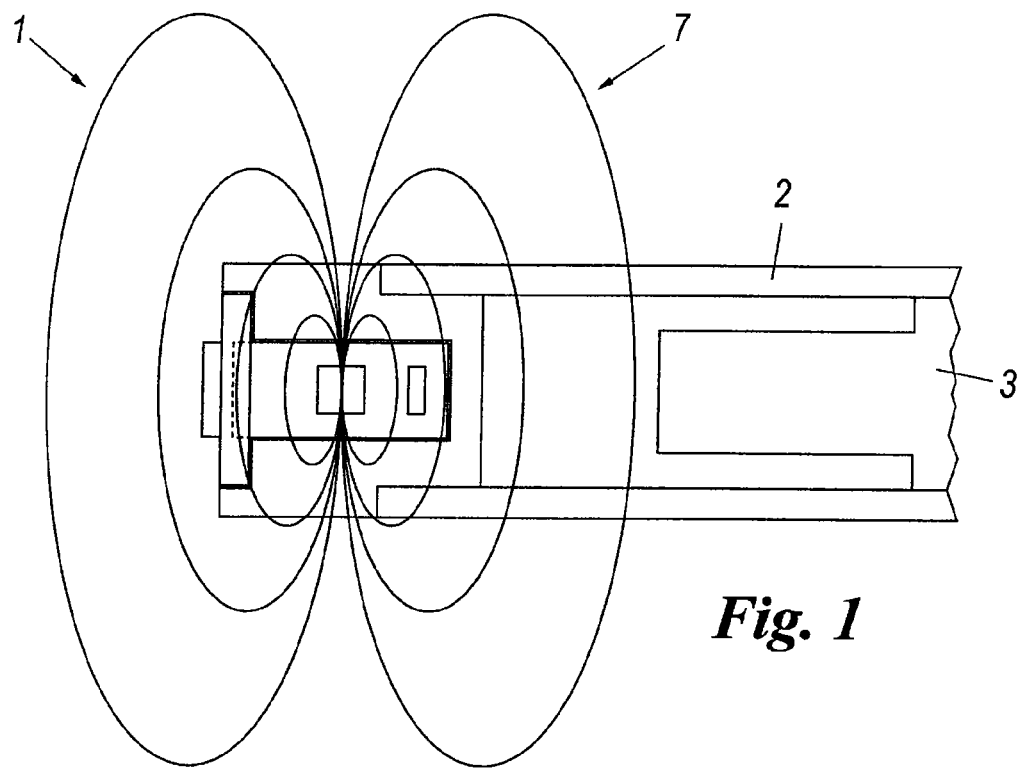
FIG. 1 is a schematic view of a device according to the present invention.

With reference to said figures, these show a stroke counting device, indicated overall by the reference numeral 1, for a piston sliding within a cylinder.

The figures show the device 1 applied to a fluid measurement/division device presenting a cylinder 2 within which a piston 3 slides.

The device 1 comprises a support 5 (facing the interior of the cylinder 2) housing a magnet 6 which generates a magnetic field (indicated by 7 in FIG. 1).

The support 5 also houses a sensor 9 in the form of a Hall sensor, i.e. a sensor which by utilizing the Hall effect is able to sense the intensity of the magnetic field within which it is immersed.

Passage of the piston 3 into a position corresponding with the magnet 6 causes a disturbance in the magnetic field, which is sensed by the sensor 9, to indicate a stroke of the piston 3.

Advantageously, the support 5 is made of a non-magnetic material (preferably non-magnetic steel), whereas the cylinder 2 can be made of magnetic material (such as steel) or non-magnetic material; the piston 3 is made of a magnetic material (steel).

The support 5 is provided with a connector 10 connected to the sensor 9 and connectable to a PLC; in this manner the signals sensed by the sensor 9 can be transmitted to the management and/or control PLC.

The magnet 6 and sensor 9 are both connected to a printed circuit 11 provided with suitable connections (not shown) to the connector 10; in this manner all the connections between the various components can be made easily and reliably.

In the printed circuit 11 the sensor 9 is disposed in a position closer to a cylinder 2 closing wall 15 of the support 5 than the magnet 6.

This printed circuit 11 (together with the magnet 6 and sensor 9) is inserted into a chamber 16 formed in the support 5; the chamber 16 is accessible from the outside through an aperture closed by a closure element 17.

In the embodiment shown in the figures, the closure element 17 carries the connector 10 and is secured to the support 5 for example by screws.

Preferably, the support 5 consists of a plug arranged to close one end of the cylinder 2.

Advantageously, as the plug 5 does not present components directly facing the cylinder interior and the thickness of the wall 15 can be chosen large, the plug 5 (and hence the device which it supports) can be used together with a cylinder 2 in which high or very high pressure, up to or greater than 500-1000 bars, is present.

The operation of the device of the invention is apparent from that described and illustrated, and is substantially the following.

When the piston 3 is in a position distant from the plug 5 (FIG. 3) the magnetic field assumes a predetermined configuration; The Hall sensor 9 senses the intensity of the magnetic field in which it is immersed and feeds a first signal indicative of this intensity to the control PLC via the connector 10.

Figure 2:
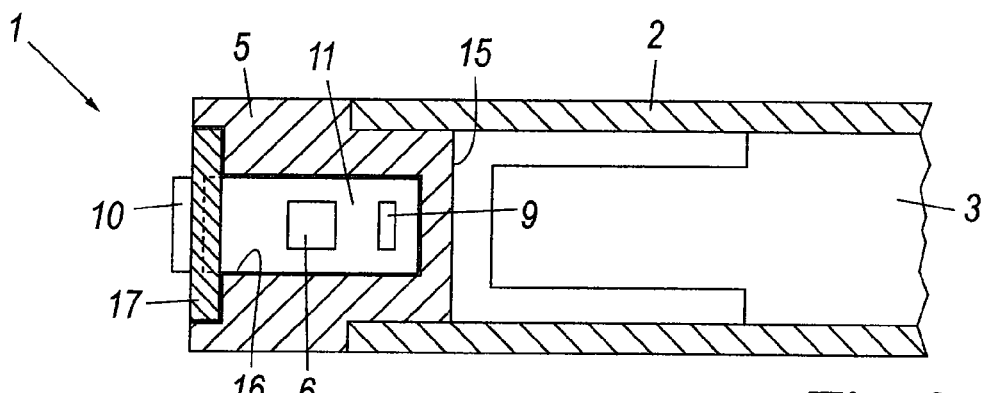
FIGS. 2 and 3 show a schematic section through a device of the invention with the piston in a position close to and respectively far from a magnetic field sensor.

When the piston 3 comes into proximity with the plug 5 (FIG. 2), as it is made of magnetic material it influences the magnetic field generated by the magnet 6, to generate a disturbance and modify its lines of force.

Figure 3:
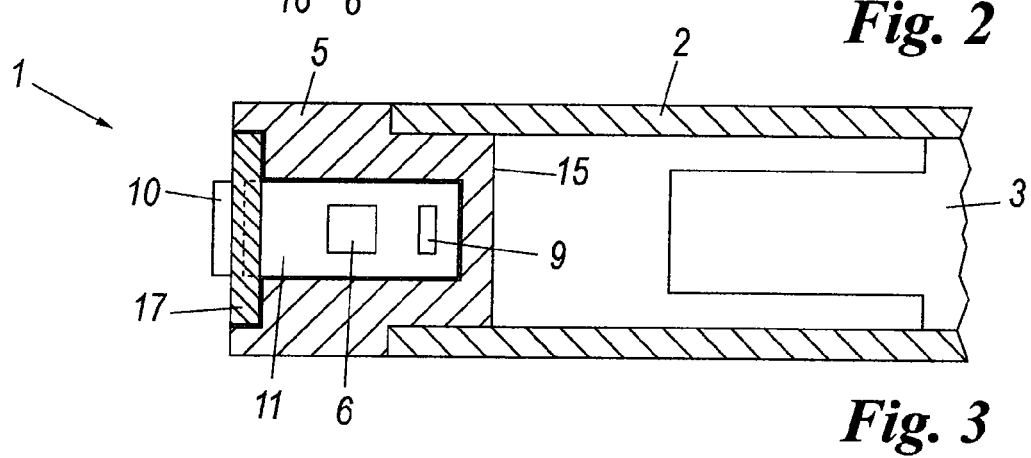

The Hall sensor 9 senses that the magnetic field intensity has been modified by the cylinder 3 and is thus different from that sensed in the configuration of FIG. 3, to feed to the PLC a second signal indicative of the measurement effected.

The PLC (by means of software stored in it) can associate the piston position with each signal and is able to determine the number of strokes of the piston 3 by measuring the number of first signal-second signal variations.

It has been found in practice that the device of the invention is particularly advantageous as it can also be used at very high pressure and is not subject to wear.

Moreover, as the components used are very small, the device can be integrated into a cylinder plug.

The device conceived in this manner is susceptible to numerous modifications and variants, all falling within the scope of the inventive concept; moreover all details can be replaced by technically equivalent elements.

In practice the materials used and the dimensions can be chosen at will according to requirements and to the state of the art.

What I claim is:

1. A device for counting the strokes of a piston sliding within a cylinder comprising a support housing a magnet which generates a magnetic field, said support also housing a sensor arranged to sense said magnetic field, such that the passage of said piston into a position corresponding with the magnet causes a disturbance in the magnetic field, which is sensed by the sensor, to indicate a stroke of the piston, the support presenting a closing wall formed integrally with the support and facing the cylinder interior when mounted.

2. A device as claimed in claim 1, wherein said support is made of non-magnetic material.

3. A device as claimed in claim 1, wherein said support is provided with a connector connected to said sensor and connectable to a PLC.

4. A device as claimed in claim 1, wherein said sensor is located in a position closer to a cylinder closing wall than the magnet.

5. A device as claimed in claim 1, wherein said support presents a chamber into which said sensor and said magnet are inserted, said chamber being closed by a closure element.

6. A device as claimed in claim 1, wherein said support consists of a plug arranged to close one end of said cylinder.

7. A device as claimed in claim 1, wherein said sensor is a Hall sensor.

8. A device as claimed in claim 1, wherein said sensor and said magnet are both connected to a printed circuit.

9. A device as claimed in claim 1, further being applied to a cylinder in the interior of which a high or very high pressure operates.

10. A device as claimed in claim 1, further being applied as closure for the cylinders of a fluid measurement and/or division device.

\* \* \* \* \*

UNITED STATES PATENT AND TRADEMARK OFFICE
CERTIFICATE OF CORRECTION

PATENT NO. : 7,688,065 B2 Page 1 of 1
APPLICATION NO. : 12/120869
DATED : March 30, 2010
INVENTOR(S) : Walter Divisi It is certified that error appears in the above-identified patent and that said Letters Patent is hereby corrected as shown below:

Title Page, item (73)
Assignee should read -- DROPSA S.P.A., Milano, Italy --.

Signed and Sealed this

Twenty-seventh Day of July, 2010

David J. Kappos
*Director of the United States Patent and Trademark Office*